United States Patent Office 3,530,005
Patented Sept. 22, 1970

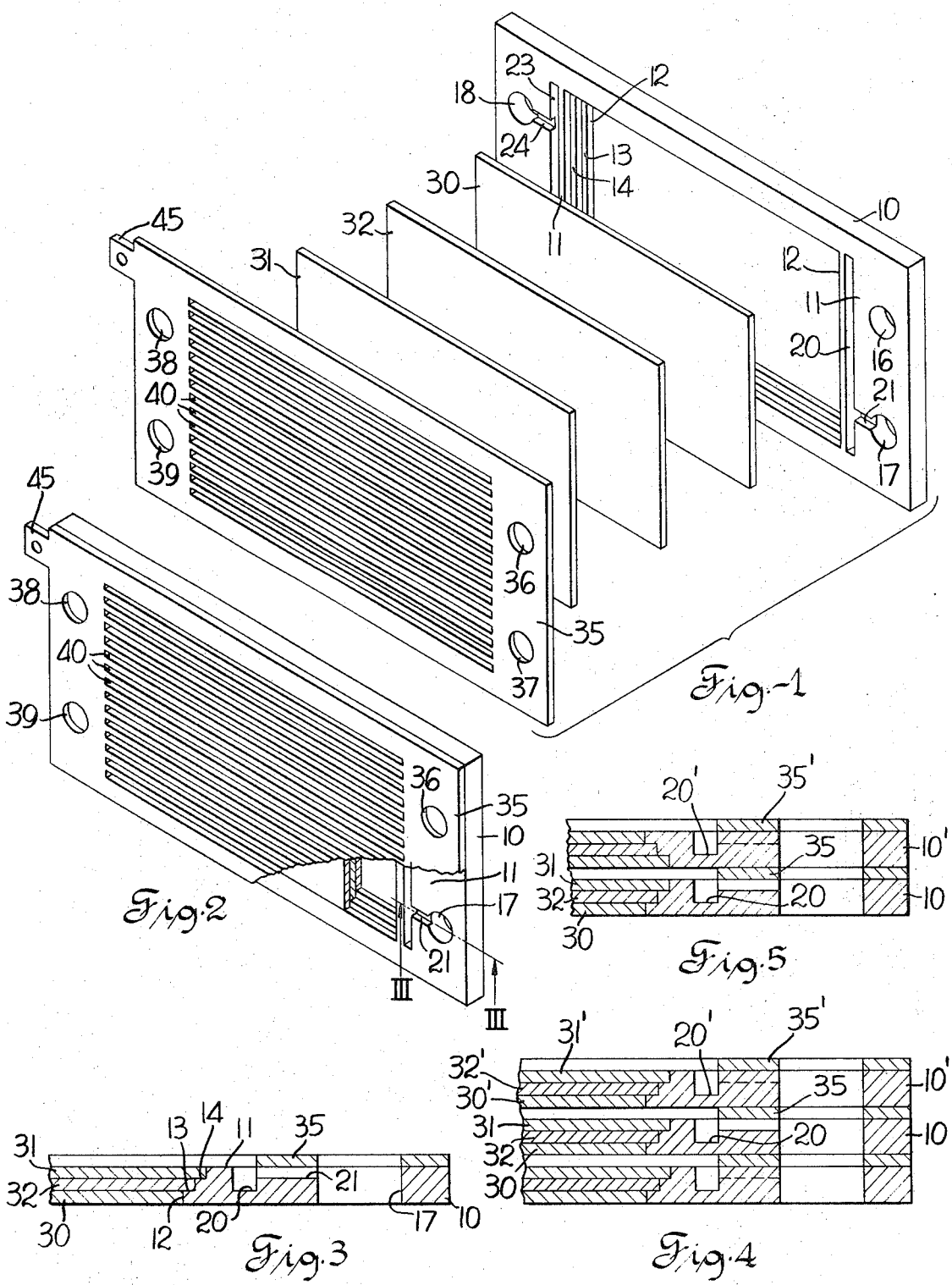

3,530,005
COMPACT ELECTROCHEMICAL CELL
Ronald J. Leonard, Elk Grove Village, Ill., assignor to Allis-Chalmers Manufacturing Company, Milwaukee, Wis.
Filed June 21, 1968, Ser. No. 738,983
Int. Cl. H01m 27/00; B01k 3/00
U.S. Cl. 136—86                                    4 Claims

ABSTRACT OF THE DISCLOSURE

An individual electrochemical cell for use in combination with other such cells wherein a pair of porous electrodes, spaced by an electrolyte matrix, are secured by a frame member around the periphery. A single fluid distribution plate, having a fluid distribution grid therethrough, overlaps the frame member. The frame member and fluid distribution plate are provided with a pair of reactant inlet ports and a pair of product outlet ports. The face of said frame member against said gas distribution plate is provided with a predistribution groove, communicating with one of said inlet ports, under one of the fluid distribution grid; and a collecting groove, communicating with one of said outlet ports, under the opposite end of said fluid distribution grid.

BACKGROUND OF THE INVENTION

This invention relates to electrochemical cells and more particularly, to a compact cell arrangement including fluid distribution means therefor. In particular, this invention relates to a thin compact electrochemical cell component to be used in combination with other such cells to construct a battery of cells.

Devices for the direct production of electrical energy from chemical energy by electrochemical means are commonly known as fuel cells.

An individual fuel cell is ordinarily made up of a cell container, two conducting porous electrodes consisting of or impregnated with a material having a catalytic effect upon the desired electrochemical reactions, an electrolyte situated between and in contact with the electrodes, electrical connecting means associated with an external circuit, means for introducing an oxidizing reactant to a cathode, means for introducing a fuel to an anode, and means for removal of by-product water and heat from the fuel cell.

Design considerations dictate that the electrode configuration employed be that which permits the most effective utilization of the available cell space. For most applications, relatively thin, flat, plate type electrodes are employed which permit stacking of the fuel cell elements. This arrangement provides the most advantageous use of space in relation to the output of the fuel cell element.

In operation, the oxidizing reactant and the fuel reactant are introduced under pressure through the backs of the porous electrodes. As the thin, porous electrodes generally have limited physical strength, the electrodes are supported by backing plates. The backing plate that is employed may, in addition to providing physical support for the electrodes, provide means for uniform distribution of the fluid reactants over the back surface of the porous electrode as well as serving as a means for providing electrical contact of the cell electrodes with the external circuit. The opposite side of the electrode is adapted to be in contact wih an ion-conducting electrolyte.

The electrode backing plate is generally a flat, thin plate made of or plated with a corrosion resistant metal such as nickel, gold, silver or the like. On the surface of the electrode backing plate a network of channels provide a means for supplying fresh reactant to the backs of the electrodes and means for removing accumulated inert gases and water vapor product.

Electrode backing plates which have heretofore been advantageously employed, are solid or laminated metal plates having formed on at least one face thereof, a series of interconnecting recesses or grooves forming a grid fluid distribution network which provides fluid distribution over the back surface of the electrode. Ports drilled through opposite ends of the plates, which communicate the grid distribution network, provide a means whereby a suitable manifold structure may be connected to the plates to supply reactants and to exhaust accumulated inert gases and the like from the fuel cell. To make the fluid distribution more uniform, some form of predistribution means communicating between a pair of manifold ports is usually provided through the body or the face of the backing plate to more uniformly distribute reactant to the distribution grid and to more uniformly remove reaction products therefrom. In laminated backing plates, this predistribution means usually comprises a slot or grid in the middle sheet which passes or pass transversely to the distribution grids in the two outer sheets.

In order to generate sufficient power for most practical applications, a plurality, or battery, of individual fuel cells connected in series is usually required. Such a structure, commonly referred to as a "fuel cell stack," usually comprises a plurality of alternating cells and backing plates. Typically, such a stack becomes rather large because of the large number of relatively thick backing plates.

Other electrochemical cells, such as gas electro-winning cells and electrolysis cells, are frequently very similar physically to fuel cells as described above. Their operation, however is the reverse process to the fuel cell operation. That is, instead of supplying fluid or gases to the electrodes to generate an electrical potential thereaccross, an electrical potential is applied to generate a gas or gases at the electrodes. The gases are taken out of the system through the same types of distribution grids as are used to feed reactants to fuel cells.

SUMMARY OF THE INVENTION

In accordance with the present invention, there is provided a thin, unitary electrochemical cell assembly comprising a thin, single sheet fluid distribution grid and an abutting frame member containing the electrodes and electrolyte. The fluid predistribution means is provided in the frame which contains the electrodes thus permitting a thinner distribution grid, and accordingly more compact fuel cell stacks or stacks of other electrochemical cells. The frame member is also provided with stepped recesses supporting an electrode and/or electrolyte matrix which provides a simple positive seal within the cell.

Accordingly, it is a primary object of this invention to provide a simplified electrochemical cell construction.

It is another object of this invention to provide a simplified fluid distribution system for fuel cells and other electrochemical cells which permit a single sheet distribution grid and accordingly more compact cell stacks.

It is a further object of this invention to provide a simplified means for providing a seal between electrodes in an individual cell.

BRIEF DESCRIPTION OF THE DRAWINGS

The electrochemical cell of the present invention will be more fully understood by reference to the accompanying drawings in which:

FIG. 1 is an exploded isometric view of a single cell assembly incorporating the preferred embodiments of this invention;

FIG. 2 is a perspective partial cut-away view of the cell shown in FIG. 1;

FIG. 3 is a partial cross sectional view of the cell assembly taken along lines III—III of FIG. 2;

FIG. 4 is a partial cross sectional view of the cell as shown in FIG. 3 except that the two abutting cells are shown in place to illustrate the cooperation between cells in a cell stack; and FIG. 5 is a partial cross sectional view similar to FIG. 4 except that a different electrode sizing arrangement is shown.

DESCRIPTION OF THE PREFERRED EMBODIMENTS

Referring to the drawings, the fuel cell or electrochemical cell's assembly of this invention comprises a plate like frame member 10 to which all other components of the cell are secured. Frame member 10 is fabricated of a nonconductive sheet or plate material, and is provided with a large opening 12 in the approximate center of the elongated faces 11 thereof. Although the drawings show frame member 10 and opening 12 to be rectangular, resembling a conventional picture frame, it should be understood that other geometric configurations could be used. A circular configuration particularly may be a desirable shape for some applications.

As shown, the inner surface of frame member 10 forming the periphery of opening 12 is provided with two steps 13 and 14 which are parallel to the elongated surface 11 of frame member 10, so that opening 12 has larger dimensions on one side of frame member 10 than on the reverse side. The progression of steps to diverge the dimensions of the opening are provided to facilitate assembly of the cell and to provide a positive seal around the border of the elcetrolyte containing matrix 32 between the electrodes. Hence, the walls forming opening 12 could be smooth if some other means is used to provide a gas-tight seal between the electrodes.

A pair of reactant inlet ports 16 and 17 are provided through a portion of face 11 on frame member 10 adjacent to opening 12, while a pair of product outlet ports 18 are provided through another portion of face 11 opposed across opening 12 from inlet ports 16 and 17. (As shown in FIG. 1, only one such outlet port 18 can actually be seen.)

An elongated predistribution groove 20 is provided on face 11 between inlet ports 16–17 and opening 12. Groove 20 does not penetrate all the way through frame member 10, and is parallel to, and substantially of the same length as, the nearest edge of opening 12. Communication between the predistribution groove 20 and one of the inlet ports 16 or 17 is provided by an inlet feeder slot 21. The opposing side, or outlet side, of frame member 10 is substantially identical to the inlet side just described, in that an elongated collecting groove 23 is disposed between the outlet ports 18 and opening 12, and said collecting groove 23 is parallel to, and substantially of the same length as the nearest side of opening 12, and an outlet feeder slot 24 communicates with the collecting groove 23 and one of the outlet ports 18.

As in more conventional fuel cells, two porous electrodes 30 and 31 are provided and are spaced apart by an electrolyte containing matrix 32. These three members are all contained within frame member 10 as follows. Electrode 30, having dimensions which correspond closely with the dimensions on the smaller end of opening 12, is snugly fitted into said smaller portion of opening 12. The electrolyte containing matrix 32 has dimensions slightly greater than the dimensions of electrode 30 and correspond closely with the next larger portion of opening 12. Thus, matrix 32 is inserted into opening 12 adjacent to electrode 30 and is snugly held in place by the step 13. Electrode 31 has dimensions slightly larger than the dimensions of the electrolyte containing matrix 32, said dimensions corresponding closely with the dimensions of the widest part of opening 12. Electrode 31 is accordingly inserted into opening 12 adjacent to the electrolyte containing matrix 32 and is snugly held in place by step 14.

As noted previously, the stepped wall arrangements to diverge the dimensions of opening 12 not only facilitates assembly of the cell, but also provides a positive seal around the border of the electrolyte containing matrix 32 between the electrodes to prevent leakage of the reactants from one electrode to the other at the peripheral edges of the electrodes 30–31 and matrix 32. Hence, the periphery of the electrolyte matrix 32 pressed and/or bonded against the first step 13 provides one seal, and the periphery of electrode 31 pressed and/or bonded against the second step 14 may provide a second seal. Since only one seal would be sufficient in most applications, it may be preferred to provide only one step. In that case, electrolyte matrix 32 will have the same peripheral dimensions as the larger of the two electrodes. It is further possible that the walls of opening 12 could be made straight, that is without any steps, to receive electrodes and matrix of equal peripheral dimensions if some other means is used to provide a seal between the electrodes.

From the drawings and the above description, it is apparent that the frame member 10 should have a thickness no greater than the combined thickness of the two electrodes 30–31 and the electrolyte containing matrix 32. And accordingly, each step, such as steps 13 and 14 in the periphery of opening 12, should have a height no greater than the thickness of the electrode or matrix that will fit thereinto. In order to effect a suitable seal, it is preferred, however, that the thickness of frame member 10 should be less than the combined thickness of electrodes 30–31 and matrix 32. That is, a tight peripheral seal can best be effected if the matrix 32 and larger electrode 31 are slightly compressed against steps 13 and 14.

To complete the assembly, a fluid distribution plate 35, having peripheral dimensions the same as those of the frame member 10, is placed over the larger electrode 31 and secured to the frame member 10 by any means such as, for example, countersunk screws or clamps (not shown). Fluid distribution plate 35 is provided with a pair of reactant inlet ports 36 and 37 at one end thereof and should be contiguous with, and form an extension of, inlet ports 16 and 17 through frame member 10. Similarly, a pair of product outlet ports 38 and 39 are provided through the opposite end of plate 35 to be contiguous with, and form an extension of, outlet ports 18 through frame member 10. The central portion of plate 35 is provided with a plurality of parallel gas distribution slots 40 which overlay the predistribution groove 20 at one end thereof and the collecting groove 23 at the other end, and are open to the outer surface of electrode 31. Accordingly, there is relatively unrestricted passage from one of said inlet ports 16 or 17 to one of said outlet ports 18 via the inlet feeder slot 21, predistribution groove 20, fluid distribution slots or grid 40, collecting groove 23, and outlet feeder slot 24. It is, of course, obvious that some form of sealing means such as a gasket (not shown) would have to be used to prevent external fluid leakage from the cell and to prevent the reactant gases from mingling.

Although the assembly as described above is representative of one complete individual cell, its proper function requires the cooperation of similar cells in immediate face-to-face contact therewith. Specifically, the fluid distribution grid 40 in distribution plate 35 not only supplies reactant to electrode 31, but also to an electrode in the cell immediately adjacent thereto (FIG. 4). Similarly, it will be noted that as shown in FIGS. 1, 2 and 3, there is no reactant or fluid distribution means for electrode 30. As should be apparent from the above statements, reactant is supplied to this electrode 30 by a fluid distribution grid in the plate secured to the adjacent cell.

To construct a fuel cell stack, a plurality of individual cells as described above must be joined together as shown in FIG. 4. Of course, suitable sealing or gasketing means (not shown) must be used between cells. It should be apparent, however, that these cells cannot all be identical in every respect. That is to say, except for the two end cells, there must be two slightly different cell arrangements used and placed in an alternate order within the stack. Thus, half of the individual cells may be substantially as shown in FIGS. 1 and 2. The other half are substantially the same, except that grooves 20' and 23' (corresponding to grooves 20 and 23) communicate with the other inlet and outlet ports. In addition, the electrode polarities must also be alternated so that each distribution plate 35 is disposed between electrodes of like polarity. For example, in FIG. 2, if the smaller electrode 30 is the anode and thus the larger electrode 31 is the cathode, then in the immediately adjoining cells this order is reversed with smaller electrode 30' being a cathode and larger electrode 31' being an anode. It is, of course, not necessary that the lowermost electrode always be the smaller. If preferred, therefore, the size arrangement may be alternated as shown in FIG. 5 so that all smaller electrodes will be of like polarity and all larger electrodes of like polarity. Accordingly, when the cells are joined together as shown in FIGS. 4 and 5, the distribution grid in distribution plate 35 will supply a single reactant to two like electrodes. At one location, the distribution grid will supply fuel to a pair of abutting anodes, and at the next location the grid will supply an oxidant to a pair of abutting cathodes. It is, therefore, apparent that the feeder slots 21 must alternate between port 16 and 17 so that in one position it is providing fuel to the anodes, and in the next supplying oxidant to the cathodes, and so on.

The two end cells must, of course, be slightly different since they cannot cooperate with adjoining cells. Actually, they can be identical to the cells as described above except means (not shown) must be provided to supply reactant to the outermost electrode at the one end (the bottom electrode as shown in FIG. 4), and a sealing means (not shown) over the distribution grid at the other end so that the grid is not open to the atmosphere.

It is, of course, obvious that some means must be provided to draw electrical current from each cell. As in many prior art applications, this can be done by making the fluid distribution plate 35 of a conductive metal and then providing lugs 45 thereon which may be mere projections of plate 35. However, if plastic or some other nonconductive material is preferred for the distribution plate, conductive extensions (not shown) of the electrodes themselves may be used.

It is apparent that a number of modifications and additional features could be incorporated into the embodiment detailed above without departing from the basic concept of this invention. For example, as in some prior art fuel cells, a membrane type of water removal system could be included in a fuel cell stack as described above. This would merely require utilizing a member (not shown) similar to frame member 10 to hold and support the liquid permeable-gas impermeable barrier adjacent to the water producing electrodes and utilizing a grid network, such as described above, to carry away the water.

The embodiments of the invention in which an exclusive property or privilege is claimed are defined as follows:

1. An individual electrochemical cell for use in combination with other such cells to construct a battery of cells, consisting essentially of a plate like frame member having a large opening through the faces thereof, a pair of porous electrodes and an electrolyte containing matrix spacing said electrodes, said electrodes and matrix disposed within said large opening and supported at the peripheral edges thereof; and a single fluid distribution plate overlaying one face of said frame member and accordingly the outer surface of one of said electrodes; said frame member and said fluid distribution plate having a pair of reactant inlet ports and a pair of product outlet ports extending therethrough; the face of said frame member adjacent to said fluid distribution plate further provided with an elongated predistribution groove between said large opening and said reactant inlet ports, an elongated collecting groove between said large opening and said product outlet ports, and a feeder slot communicating between each of said grooves and one of said ports; and said fluid distribution plate further provided with a plurality of fluid distribution slots which overlay one of said electrodes and overlay said predistribution groove at one end thereof and said collecting groove at the other end thereof.

2. An electrochemical cell according to claim 1 wherein said predistribution groove and said collecting groove are each parallel to the nearest side of said large opening, and are of substantially the same length as the nearest side of said large opening.

3. An electrochemical cell according to claim 1 wherein the edges of said frame member defining said larger opening are provided with a step therearound to diverge the dimensions of said opening, and wherein the first electrode, having given peripheral dimensions, is held within the smaller portion of said large opening and the second electrode, having larger peripheral dimensions than the first electrode, is held within the larger portion of said large opening.

4. An electrochemical cell according to claim 1 wherein the edges of said frame member defining said large opening are provided with a pair of steps therearound to progressively diverge the dimensions of said large opening so as to receive a first electrode having given peripheral dimensions, and electrolyte matrix having peripheral dimensions slightly larger than said first electrode, and a second electrode having peripheral dimensions slightly larger than said electrolyte matrix.

References Cited
UNITED STATES PATENTS

| | | | |
|---|---|---|---|
| 3,188,242 | 6/1965 | Kordesch et al. | 136—86 |
| 3,278,336 | 10/1966 | Uline et al. | 136—86 |
| 3,370,984 | 2/1968 | Platner | 136—86 |
| 3,445,294 | 5/1969 | Leonard | 136—86 |

ALLEN B. CURTIS, Primary Examiner

U.S. Cl. X.R.

204—277